J. M. SHEPHERD.
WEED AND STALK TURNING ATTACHMENT FOR PLOWS.
APPLICATION FILED AUG. 5, 1912.
1,101,717.
Patented June 30, 1914.
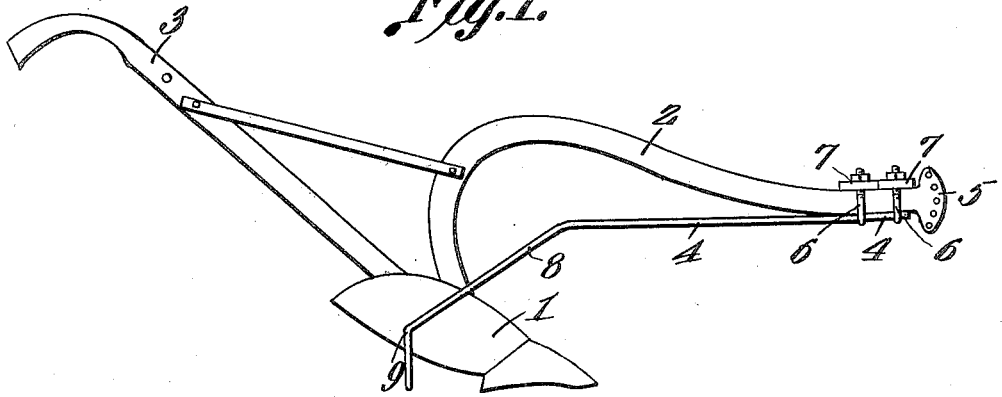
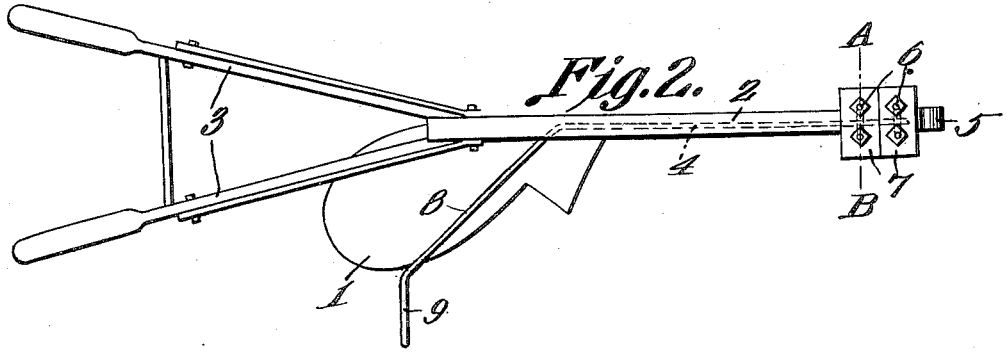
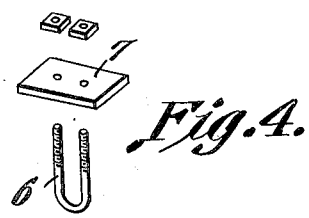
James M. Shepherd,
Inventor
Witnesses
by C.A. Snow & Co.
Attorneys

UNITED STATES PATENT OFFICE.

JAMES MELTON SHEPHERD, OF PAVO, GEORGIA.

WEED AND STALK TURNING ATTACHMENT FOR PLOWS.

1,101,717.  Specification of Letters Patent.  Patented June 30, 1914.

Application filed August 5, 1912. Serial No. 713,376.

*To all whom it may concern:*

Be it known that I, JAMES M. SHEPHERD, a citizen of the United States, residing at Pavo, in the county of Thomas and State of Georgia, have invented a new and useful Weed and Stalk Turning Attachment for Plows, of which the following is a specification.

This invention relates to plow attachments and more particularly to means whereby weeds and stalks will be turned down into the adjacent furrows so as to be covered by the furrow slice as it is turned over by the plow to which the attachment is connected.

Another object is to provide a turning device of this character which is simple in construction, can be quickly and easily applied, and which can be used in connection with plows of different forms.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of a plow having the attachment combined therewith. Fig. 2 is a plan view thereof. Fig. 3 is a section on line A—B Fig. 2. Fig. 4 is a perspective view of one of the clamps and showing the parts disconnected.

Referring to the figures by characters of references 1 designates a plow connected to a beam 2 of any desired form and provided with handles 3.

The attachment constituting the present invention is to be secured to the front portion of the beam 2 and consists of a rod bent to form a stem 4 adapted to extend along the bottom face of the beam 2 close to the clevis 5 and to be engaged by U-bolts 6 which straddle the beam and are secured, at their ends, with a plate 7 bearing downwardly on the beam. From the stem 4 the rod is inclined downwardly and laterally as shown at 8 and merges into a laterally and downwardly extended arm 9 which is adapted to hold the turned weeds or stalks in position where they will be covered by the furrow slice. It will be noted that all portions of the arm 9 are located in a vertical plane extending transversely of the plow and at right angles to the beam 2 and there are thus no parts likely to hook onto obstructions in the path thereof and cause injury to the attachment.

It will be seen that when the plow is drawn forward the downwardly and laterally inclined portion 8 will engage the stalks or the weeds in the path thereof and turn them laterally after which they will be further engaged by the arm 9 and turned over into the path of the furrow slice overturned by the plow 1. Thus the weeds and stalks will be entirely covered and it will be unnecessary to cut them prior to plowing the soil.

Importance is attached to the fact that the device can be readily attached to plow beams of different types.

The entire attachment is preferably formed of stiff spring metal so that it will yield to a certain extent during the operation of turning the vegetation.

What is claimed is:—

The combination with a plow including a beam, of a weed and stalk turning attachment formed in a single length of spring metal and including a straight stem arranged longitudinally under the beam and having all portions thereof normally disposed in a horizontal plane, there being a downwardly and laterally inclined portion extending slightly rearwardly from the back end of the stem and to a point beyond one side of the plow, a straight arm extending laterally and downwardly from the rear end of said inclined portion and disposed with all parts in the same vertical plane extending transversely of the plow and at right angles to the beam, and means for binding the stem against the bottom of the beam to hold the stem against rotation, said stem and the parts formed therewith being adjustable angularly about the longitudinal axis of the stem when the binding means is loosened, said downwardly and laterally inclined portion being adapted to bend the weeds forwardly and laterally and said arm being adapted to engage the turned weeds and shift them inwardly to be covered by the furrow slice from the plow.

In testimony that I claim the foregoing as my own, I have hereto affixed my signature in the presence of two witnesses.

JAMES MELTON SHEPHERD.

Witnesses:
R. R. REDFEARN,
E. ALDERMAN.

Copies of this patent may be obtained for five cents each, by addressing the "Commissioner of Patents, Washington, D. C."